United States Patent
Vajravel et al.

(10) Patent No.: US 10,824,598 B2
(45) Date of Patent: Nov. 3, 2020

(54) HANDLING FILE COMMIT AND COMMIT-DELETE OPERATIONS IN AN OVERLAY OPTIMIZER

(71) Applicant: Dell Products L.P., Round Rock, TX (US)

(72) Inventors: Gokul Thiruchengode Vajravel, Rayasandra Bengaluru (IN); Ankit Kumar, Deoghar (IN)

(73) Assignee: Dell Products L.P., Round Rock, TX (US)

( * ) Notice: Subject to any disclaimer, the term of this patent is extended or adjusted under 35 U.S.C. 154(b) by 248 days.

(21) Appl. No.: 16/057,694

(22) Filed: Aug. 7, 2018

(65) Prior Publication Data
US 2020/0050685 A1 Feb. 13, 2020

(51) Int. Cl.
*G06F 16/16* (2019.01)
*G06F 16/17* (2019.01)
*G06F 16/172* (2019.01)
*G06F 16/23* (2019.01)

(52) U.S. Cl.
CPC ......... *G06F 16/1734* (2019.01); *G06F 16/16* (2019.01); *G06F 16/172* (2019.01); *G06F 16/2365* (2019.01); *G06F 16/2379* (2019.01)

(58) Field of Classification Search
None
See application file for complete search history.

(56) References Cited

U.S. PATENT DOCUMENTS

| | | | |
|---|---|---|---|
| 2005/0027957 A1 | 2/2005 | Page et al. | |
| 2005/0044548 A1* | 2/2005 | Page | G06F 8/63 718/100 |
| 2007/0186070 A1 | 8/2007 | Federa et al. | |
| 2012/0311263 A1* | 12/2012 | Kamath | G06F 3/0622 711/118 |
| 2013/0173744 A1* | 7/2013 | Xinglong | G06F 3/0617 709/217 |
| 2014/0082160 A1 | 3/2014 | Mallur et al. | |
| 2018/0217946 A1* | 8/2018 | Joshi | G06F 12/1433 |
| 2018/0225058 A1* | 8/2018 | Kaushik | G06F 3/0617 |
| 2018/0246672 A1 | 8/2018 | Graham et al. | |

* cited by examiner

*Primary Examiner* — Son T Hoang
(74) *Attorney, Agent, or Firm* — Kirton McConkie; Brian Tucker (57) ABSTRACT

File commit and commit-delete operations can be successfully completed in environments that employ an overlay optimizer to enhance the performance of a write filter. The overlay optimizer can be structured into upper and lower instances relative to the write filter. The upper instance can cause files to be moved from the write filter's overlay into an overlay cache to thereby optimize the performance of the overlay. To prevent the failure of commit and commit-delete operations that target files that have been moved to the overlay cache, the lower instance can be configured to detect when the write filter is attempting to perform a commit or commit-delete operation and can modify the processing of such operations to cause them to be completed successfully even though the files targeted by the operations do not exist in the write filter's overlay.

20 Claims, 12 Drawing Sheets

Overlay-managing
Write Filter 200

Write Filter 110

Lower Filter 400

⑦ The write filter will then complete the
commit operation using the handle to
the file stored in the overlay cache Overlay
140

Overlay Cache
240

File1

Protected Volume

Original
File1

HANDLING FILE COMMIT AND COMMIT-DELETE OPERATIONS IN AN OVERLAY OPTIMIZER

CROSS-REFERENCE TO RELATED APPLICATIONS

N/A

BACKGROUND

The Windows Embedded and Windows operating systems include functionality that can prevent the content of a storage medium from being changed. In a typical example, it may be desirable to prevent the operating system image, which may be stored on a particular disk partition or on flash media, from being changed at runtime. To accomplish this, Windows provides a file-based write filter which operates at the file level and a block-based write filter (or enhanced write filter) that operates at the block level to redirect all writes that target a protected volume to a RAM or disk cache called an overlay. This overlay stores changes made to the operating system at runtime but is removed when the device is restarted thereby restoring the device to its original state.

Figure 1:
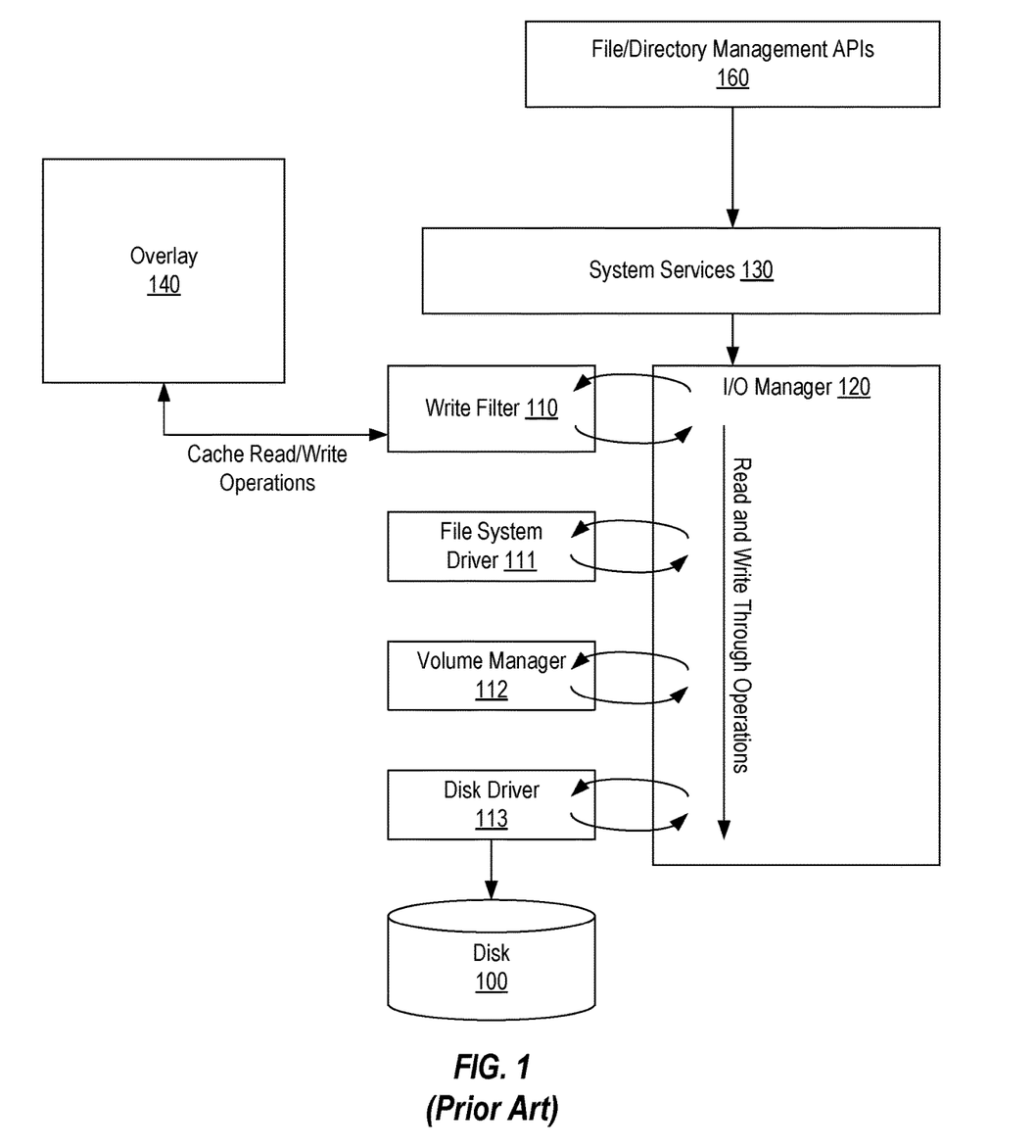
FIG. 1 illustrates a Windows-based I/O system in which a write filter is employed to redirect writes targeting a protected volume to an overlay.

FIG. 1 illustrates how a write filter 110 can be employed to prevent the contents of a protected volume on disk 100 from being modified. Disk 100 is intended to generally represent any type of physical storage medium (or volume). In accordance with the Windows architecture, a driver stack consisting of file system driver 111, volume manager 112, and disk driver 113 sit atop disk 100, and I/O manager 120 manages the flow of I/O requests through the driver stack. An application (not shown) can employ file/directory management APIs 160 to invoke a service of system services 130 (e.g., by calling ReadFile, WriteFile, CreateFile, etc. on a particular file) which will result in I/O manager 120 creating an IRP for the request. This IRP will then be passed down through the driver stack.

As depicted in FIG. 1, write filter 110 is positioned at the top of the driver stack and will therefore be able to process an IRP prior to the IRP being passed down to the lower level drivers. Write filter 110 can be configured to detect writes targeting a protected volume and redirect them to overlay 140 rather than allowing them to be passed down the driver stack unchanged. As a result, the write will actually occur in overlay 140 rather than to disk 100. Write filter 110 can be further configured to detect reads that target content that was previously redirected to overlay 140 and redirect these reads to overlay 140. In this way, even though it will appear to the application that the content of disk 100 is being updated, the updates are actually being temporarily maintained in overlay 140. The contents of overlay 140 can be maintained until the operating system is restarted or until an explicit command is received to discard the contents of the overlay.

The size of the overlay employed by the Windows write filter is static and cannot be changed without rebooting. For example, the FbwfSetCacheThreshold function allows the size of the overlay, in megabytes, to be specified. However, when this function is called, it has no effect on the size of the overlay during the current session. Instead, the specified size of the overlay will not be applied until the next session. By default, the size of the overlay will be 64 megabytes and can be increased up to the value of FBWF_MAX_CACHE_THRESHOLD.

One problem that results from the static size of the overlay is that the system will be automatically rebooted if the overlay becomes full. The user will not be presented with an option to reboot in this scenario. Over time, even if the size of the overlay is set to FBWF_MAX_CACHE_THRESHOLD, it is likely to become full and force the reboot of the system. As a result, the user experience can be greatly degraded when a write filter is employed. Also, if the size of the overlay is set too high, the system may not have enough RAM left to run multiple applications or even the operating system.

U.S. patent application Ser. No. 15/422,012, titled "Mechanism To Free Up The Overlay Of A File-Based Write Filter" (the '012 Application) describes techniques for employing an overlay-managing write filter in conjunction with the write filter to monitor files that are stored in the overlay and move files that are not currently being accessed to thereby minimize the size of the overlay. If a request is made to access a moved file, the overlay-managing write filter can modify the request so that it targets the location of the moved file rather than the location of the original file on the protected volume. In this way, the fact that modified files are being moved from the overlay but not discarded can be hidden from the write filter. As a result, the effective size of the overlay will be increased while still allowing the write filter to function in a normal fashion.

Although these techniques are effective in reducing the size of the overlay, they can create various additional problems. For example, if a commit or commit-delete operation is performed and the file targeted by the operation has been moved, the operation will fail because write filter 110 will not find the targeted file in overlay 140.

BRIEF SUMMARY

The present invention extends to methods, systems, and computer program products for handling file commit and commit-delete operations in environments that employ an overlay optimizer to enhance the performance of a write filter. The overlay optimizer can be structured into upper and lower instances relative to the write filter. The upper instance can cause files to be moved from the write filter's overlay into an overlay cache to thereby optimize the performance of the overlay. To prevent the failure of commit and commit-delete operations that target files that have been moved to the overlay cache, the lower instance can be configured to detect when the write filter is attempting to perform a commit or commit-delete operation and can modify the processing of such operations to cause them to be completed successfully even though the files targeted by the operations do not exist in the write filter's overlay.

In one embodiment, the present invention is implemented, by an overlay optimizer that includes an upper filter positioned above a write filter in a file system stack and a lower filter positioned below the write filter, as a method for handling a commit or commit-delete operation. The lower filter receives a first create operation that was initiated by the write filter in response to a commit or commit-delete operation. The first create operation identifies a file to be opened. The lower filter determines that a copy of the file identified in the first create operation is stored in an overlay cache managed by the upper filter. The lower filter then initiates a second create operation to open the file targeted by the first create operation and causes the second create operation to be passed to the upper filter. The upper filter modifies the second create operation to cause the second create operation to obtain a handle to the copy of the file that is stored in the overlay cache. The lower filter obtains the handle to the copy of the file that is stored in the overlay cache and modifies the first create operation to include the handle. The lower filter then completes the first create operation to thereby cause the write filter to perform the commit or commit-delete operation using the handle to the copy of the file that is stored in the overlay cache.

In another embodiment, the present invention is implemented as a method for handling a commit or commit-delete operation. A lower filter that is positioned below a write filter in a file system stack receives a first create operation that was initiated by the write filter in response to a commit or commit-delete operation. The first create operation identifies a file to be opened. The lower filter determines that a copy of the file identified in the first create operation is stored in an overlay cache and then initiates a second create operation to open the file targeted by the first create operation. The lower filter obtains, from the second create operation, a handle to the copy of the file that is stored in the overlay cache, modifies the first create operation to include the handle, and completes the first create operation to thereby cause the write filter to perform the commit or commit-delete operation using the handle to the copy of the file that is stored in the overlay cache.

In another embodiment, the present invention is implemented as a method for handling a commit or commit-delete operation. A lower filter receives, via a preoperation callback routine, a first create operation that identifies a file to be opened. The lower filter determines that a copy of the file identified in the first create operation is stored in an overlay cache, and initiates a second create operation to open the file targeted by the first create operation. The lower filter obtains, from the second create operation, a handle to the copy of the file that is stored in the overlay cache, modifies the first create operation to include the handle, and completes, in the preoperation callback routine, the first create operation.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

In this specification, the term "artifact" should be construed as encompassing files, directories, registry entries, or any other structure of a file system that can be modified via an I/O request. A "write filter" should be construed as encompassing the File-based Write Filter (FBWF) that is included in the Windows Embedded operating system, the Unified Write Filter (UWF) that is included in the Windows operating system, any equivalent write filter that may be provided in future releases of Windows, or any write filter that performs equivalent functionality in other operating systems (i.e., redirecting writes targeting a protected volume to a separate, and possibly temporary, storage location). A "protected volume" should be construed as a volume storing artifacts that a write filter protects from modification. A "commit operation" should be construed as an I/O operation that requests that a file that is stored in an overlay be committed to the protected volume. A "commit-delete operation" should be construed as an I/O operation that requests that a file that has been stored in an overlay be deleted from the protected volume.

Figure 2:
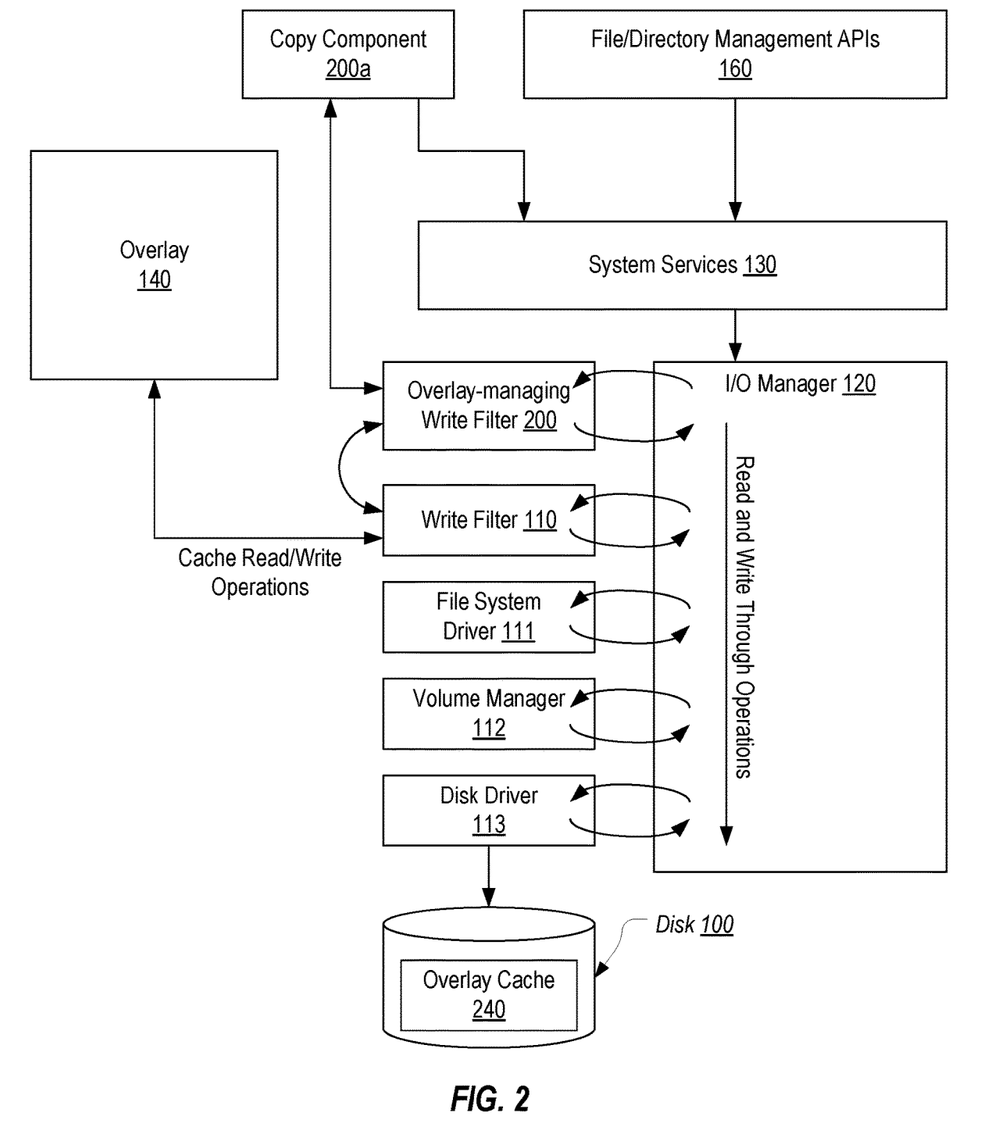
FIG. 2 illustrates how an overlay optimizer can be employed in conjunction with the write filter of FIG. 1 to free up the overlay.
Figure 3:
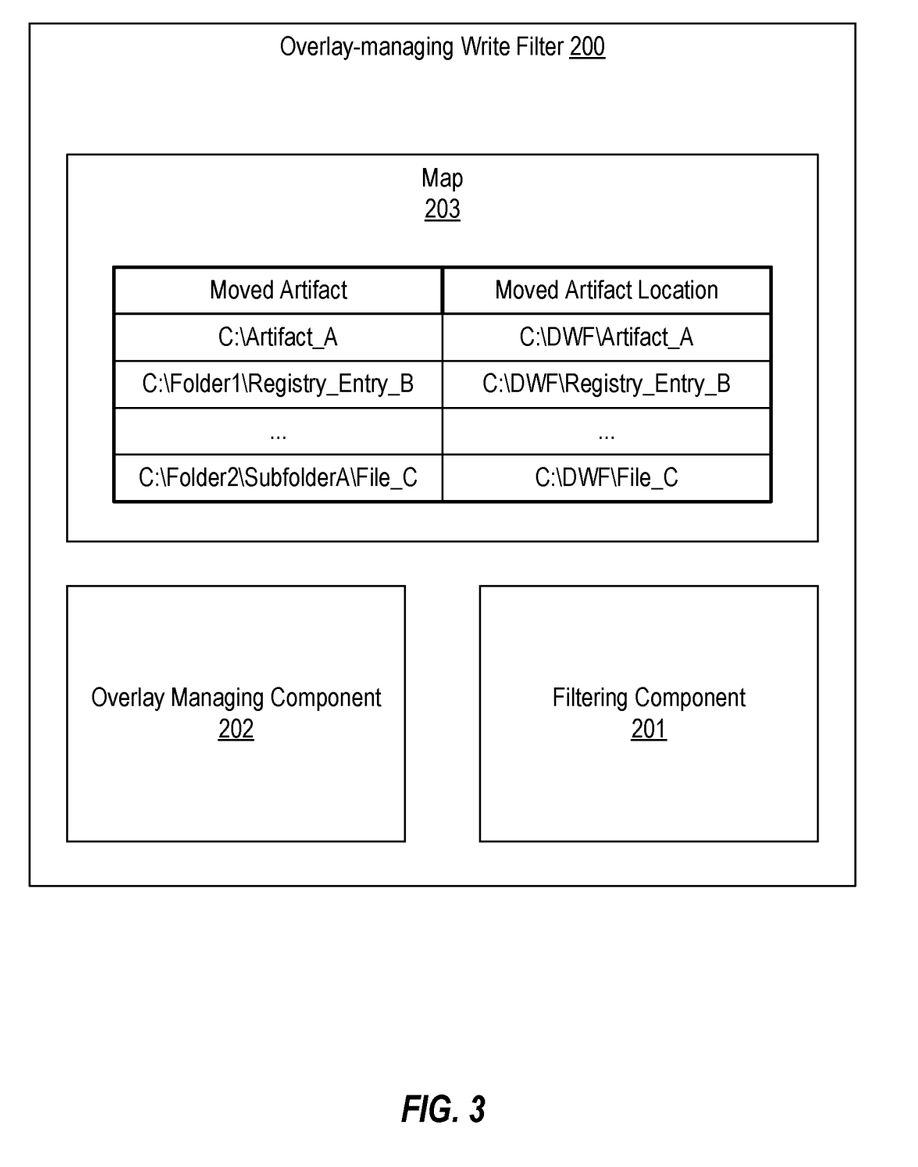
FIG. 3 illustrates various example components of an overlay-managing write filter.

FIGS. 2 and 3 and the following discussion is taken from the description of the '012 Application and is intended to provide an overview of one environment in which the present invention can be implemented. FIG. 2 is based on FIG. 1 and illustrates how an overlay-managing write filter 200 can be used in conjunction with write filter 110 to manage artifacts that are stored in overlay 140. More particularly, overlay-managing write filter 200 can monitor which artifacts in overlay 140 are not currently being accessed and can move them to an overlay cache 240 in the protected volume on disk 100. In some embodiments, this moving of artifacts can be carried out by employing a copy component 200a of overlay-managing write filter 200 that may preferably run in user mode. After moving an artifact to overlay cache 240, overlay-managing write filter 200 can cause the artifact to be discarded from overlay 140 thereby reducing the size of overlay 140 to prevent overlay 140 from becoming full. To ensure that the modifications that were made to the artifact are not lost, overlay-managing write filter 200 can monitor I/O requests to allow it to intercept a request to access an artifact that has been moved to overlay cache 240 and cause the request to be redirected to overlay cache 240. In this way, the fact that overlay-managing write filter 200 moves artifacts to overlay cache 240 will be hidden from write filter 110.

In some embodiments, overlay cache 240 can comprise a portion (e.g. one or more folders) of a protected volume that has been registered as an exclusion with write filter 110. In such cases, write filter 110 will not block write requests to overlay cache 240, or in other words, overlay-managing write filter 200 will be able to copy artifacts from overlay 140 to overlay cache 240. Although any suitable mechanism for moving an artifact from overlay 140 to overlay cache 240 may be employed, in some embodiments, overlay-managing write filter 200 may employ copy component 200a to perform a copy of the artifact in overlay 140 to overlay cache 240. The '012 Application includes a detailed example of how this copying process can be performed.

As represented by the arrow between the two filters, overlay-managing write filter 200 can be configured to employ functions of write filter 110 (e.g., functions of the FBWF API provided as part of the Windows Embedded OS)

to accomplish various tasks such as identifying which artifacts in overlay 140 are not currently being accessed and instructing file-base write filter 110 to discard an artifact from overlay 140.

FIG. 3 provides an example of various components of overlay-managing write filter 200. As shown, overlay-managing write filter 200 can include a filtering component 201 and an overlay managing component 202. Filtering component 201 can generally represent the portion of overlay-managing write filter 200 that functions as a filter driver in the device stack for disk 100 (or, more specifically, in the stack for the protected volume). Accordingly, filtering component 201 can be configured to process IRPs that target artifacts on the protected volume. Importantly, because overlay-managing write filter 200 is positioned above write filter 110, filtering component 201 will be able to process these IRPs before they are handled by write filter 110.

Overlay managing component 202 can generally represent the portion of overlay-managing write filter 200 that is configured to interface with write filter 110 and possibly copy component 200a for the purpose of managing which artifacts are moved from overlay 140 to overlay cache 240 and for ensuring that subsequent requests to access a moved artifact can be handled in the proper manner (e.g., by identifying and modifying requests that target a moved artifact so that the moved artifact (which would be the modified version of the artifact) will be accessed from overlay cache 240 rather than from its permanent location on disk 100). The distinction between filtering component 201 and overlay managing component 202 is for illustrative purposes only and any suitable configuration of the functionality of overlay-managing write filter 200 may be employed. Also, a general reference to overlay-managing write filter 200 should be construed as including copy component 200a.

As shown in FIG. 3, overlay-managing write filter 200 can also maintain a map 203 which identifies which artifacts have been moved to overlay cache 240 as well as the specific location in overlay cache 240 where these moved artifacts are stored. Overlay managing component 202 can be configured to update and maintain map 203 based on which artifacts are moved to overlay cache 240. Overlay managing component 202 and/or filtering component 201 may also employ map 203 to properly redirect an I/O request that targets a moved artifact.

As mentioned above, a problem arises when a commit or commit-delete operation is requested on a file that overlay-managing write filter 200 has moved to overlay cache 240. As an example, such operations could be performed when the UWF CommitFile or CommitFileDeletion commands are invoked by an administrator. The commit and commit-delete operations both require as input the identification of a file that is stored in overlay 140. Such identifications may be obtained by enumerating the contents of overlay 140, and overlay-managing write filter 200 would cause such enumerations to include files stored in overlay cache 240. Accordingly, it is common for administrators to attempt a commit or commit-delete operation on files that are not stored in overlay 140.

Figure 4:
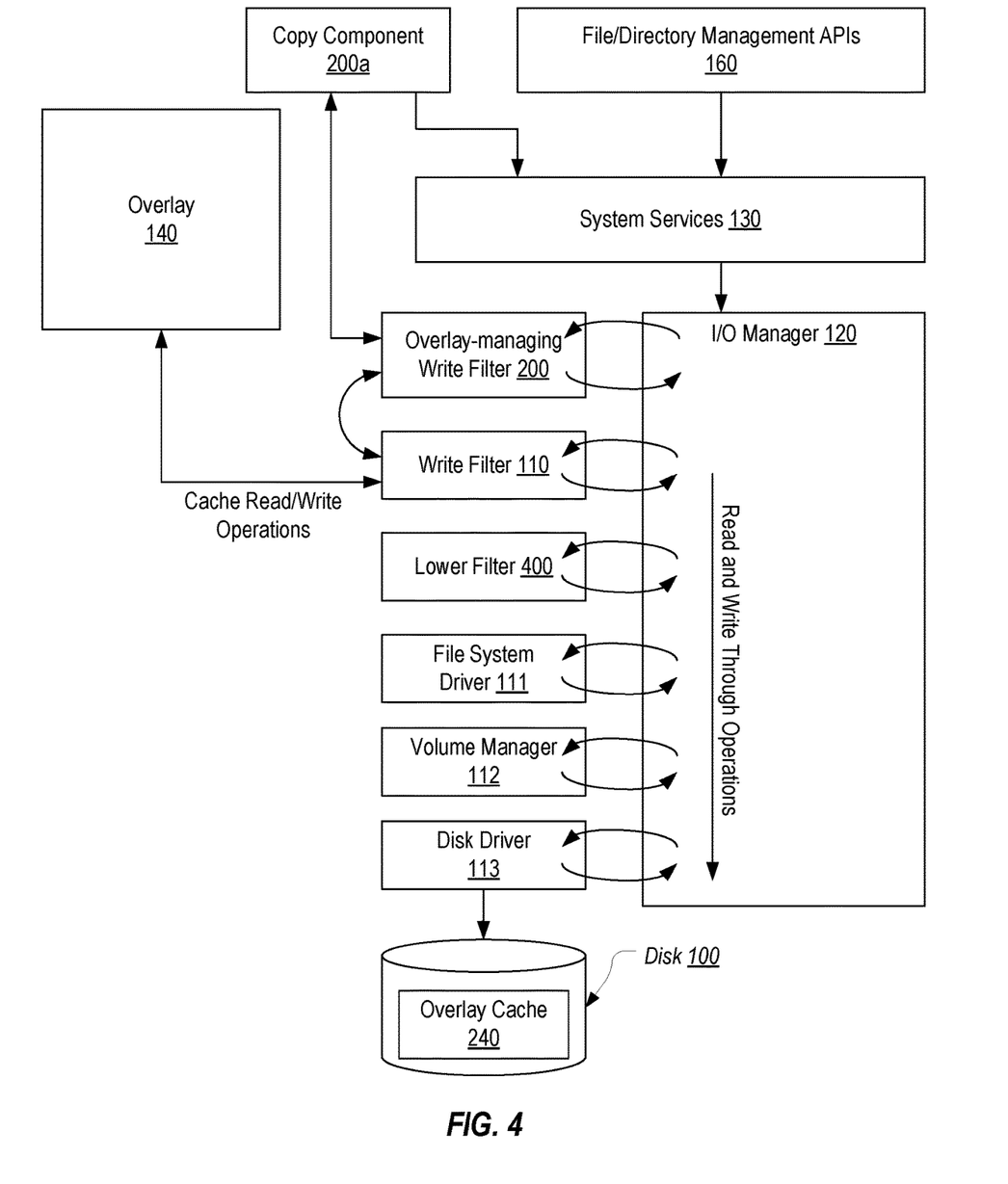
FIG. 4 illustrates an overlay optimizer can be structured into an upper instance that functions as the overlay-managing write filter and a lower instance that functions to allow commit and commit-delete operations to be completed successfully.

To address such issues, the present invention can employ an overlay optimizer that is structured into an upper instance, overlay-managing write filter 200, and a lower instance, lower filter 400, as is shown in FIG. 4. In some Windows-based embodiments, overlay-managing write filter 200 and lower filter 400 could be instances of the same minifilter that are loaded using the FltAttachVolumeAtAltitude function to position the instances above and below write filter 110. However, overlay-managing write filter 200 and lower filter 400 could equally be designed as two separate minifilters rather than instances of the same minifilter.

Overlay-managing write filter 200 can function in the manner described above to optimize overlay 140 (e.g., by monitoring for create, directory enumeration, read, write and close operations. In the case of a commit or commit-delete operation, overlay-managing write filter 200 will allow the operation to proceed to write filter 110. Then, in response to write filter 110's initial processing of the commit or commit-delete operation, lower filter 400 can initiate a process for allowing the commit or commit-delete operation to accomplish its intended function even when the target of the operation does not exist in overlay 140.

FIGS. 5A-5G illustrate how this process for allowing commit and commit-delete operations to complete successfully can be performed. This example will be based on a commit operation, but the same process can be performed for a commit-delete operation as will be described below. In this example, it will be assumed that the target of the commit operation is a file named File1 that has been modified causing it to be stored in overlay 140 but that has also been moved to overlay cache 240. The unmodified, original version of File1 remains on the protected volume. It will also be assumed that lower filter 400 has registered a preoperation callback routine for file creation operations (e.g., those that specify IRP_MJ_CREATE). A minifilter driver, such as overlay-managing write filter 200 and lower filter 400, must register a preoperation callback routine for every type of I/O operation that it desires to handle before the operation is passed to the file system and a postoperation callback routine for every type of I/O operation that is desires to handle after the operation has been completed by the file system. Otherwise, the Filter Manager component of I/O Manager 120 will not pass such operations to the minifilter driver.

Figure 5A:
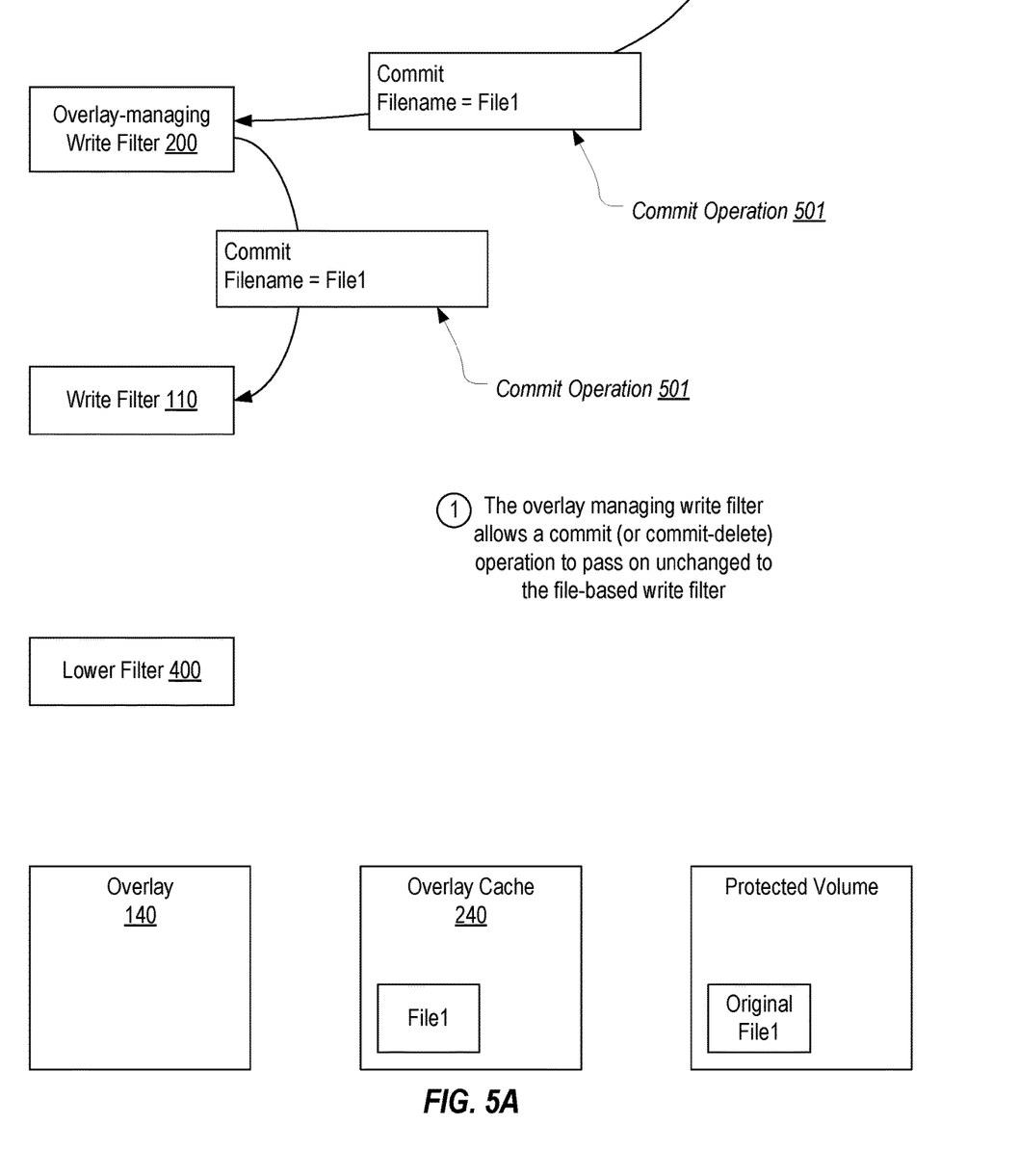
FIGS. 5A-5G illustrate a process by which the overlay optimizer can cause commit and commit-delete operations to be completed successfully.

FIG. 5A illustrates that a commit operation 501 has been passed to overlay-managing write filter 200 in step 1. In a Windows context, the Filter Manager would pass such operations in the form of a FLT_CALLBACK_DATA structure containing a FLT_IO_PARAMETER_BLOCK structure in which the type of I/O operation and the target of the I/O operation is identified and which identifies a FLT_PARAMETERS structure in which parameters of the operation are defined. Because overlay-managing write filter 200 is positioned above (i.e., at a higher altitude than) write filter 110, it will have the opportunity to process commit operation 501 prior to write filter 110. At this point, however, overlay-managing write filter 200 can allow commit operation 501 to pass on to write filter 110 without modification.

Figure 5B:
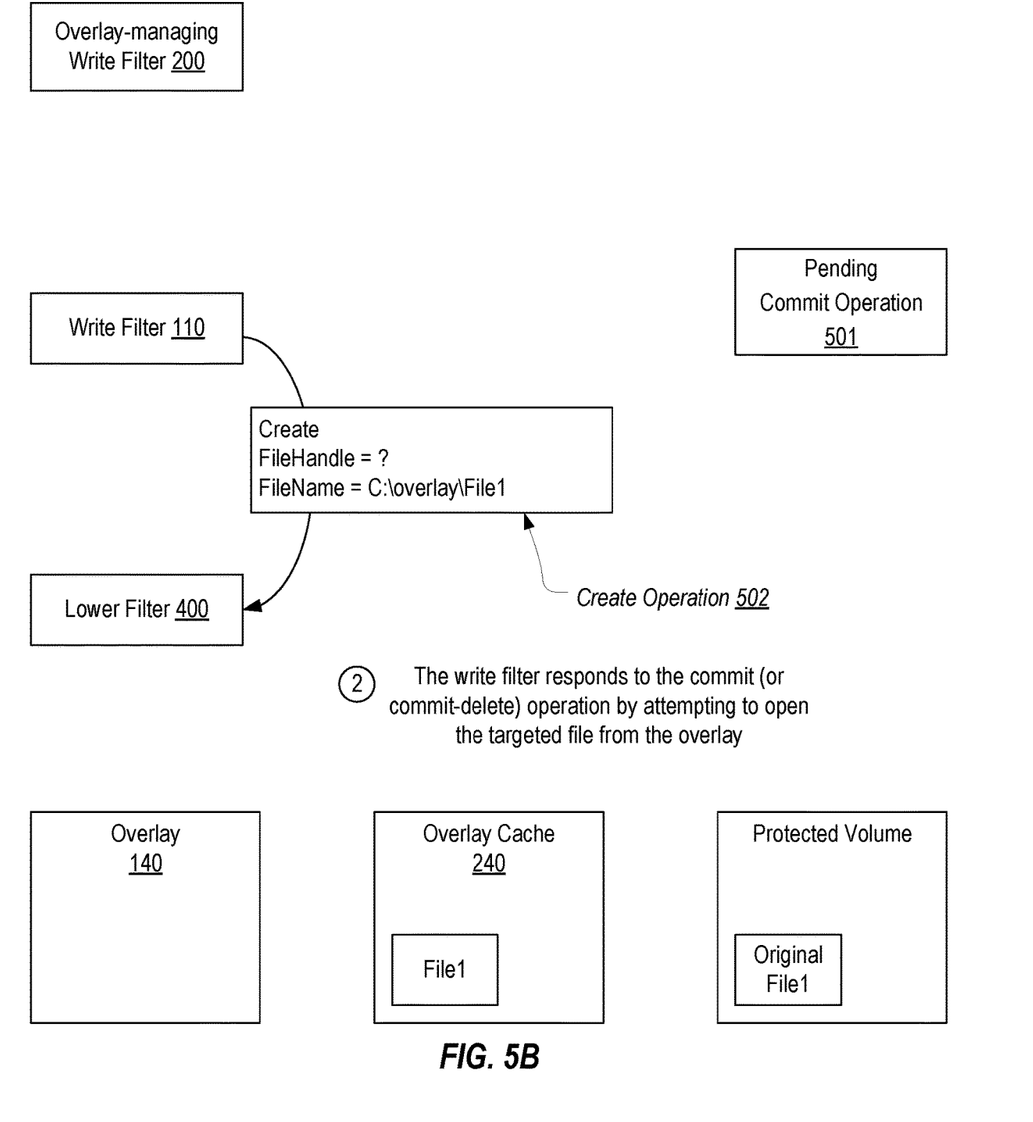

In step 2, shown in FIG. 5B, write filter 110 responds to the commit operation by initiating a create operation 502 to attempt to open the targeted file from overlay 140. Write filter 110 could accomplish this by calling FltCreateFile (or FltCreateFileEx) and specifying the full path to the targeted file. In this example, it will be assumed that overlay 140 exists at C:\overlay, and therefore, write filter 110 has specified C:\overlay\File1 as the name of the file (e.g., within the ObjectName member of the ObjectAttributes structure specified as input to the FltCreateFile function). Notably, as part of processing the commit operation, write filter 110 attempts to open the file from overlay 140 rather than from the protected volume. While create operation 502 is being processed, commit operation 501 will remain pending.

Create operation 502 functions to obtain a handle to the specified file so that the caller can manipulate the file in a desired manner. The problem arises in this scenario due to the fact that File1 is no longer stored in overlay 140 even though overlay-managing write filter 200 will cause File1 to appear as if it were stored in overlay 140. More specifically, create operation 502 is intended to open a file named File1 that is stored in overlay 140. However, because there is no file named File1 in overlay (because overlay-managing write filter 200 moved it to overlay cache 240), create operation 502 will fail (assuming the value of the CreateDisposition member is set to FILE_OPEN; otherwise, a new file may be created).

When write filter 110 calls FltCreateFile (or an equivalent function) to initiate create operation 502, it specifies a pointer to itself as input which causes create operation 502 to be sent only to minifilter drivers that are below it. Therefore, FIG. 5B shows that create operation 502 is provided to lower filter 400 rather than being started at overlay-managing write filter 200 (or any other device object that may be positioned above overlay-managing write filter 200 in the file system driver stack). As indicated above, because lower filter 400 has registered a preoperation callback routine for creation operations, the Filter Manager will pass create operation 502 to lower filter 400 before create operation 502 is passed down to file system driver 111.

Figure 5C:
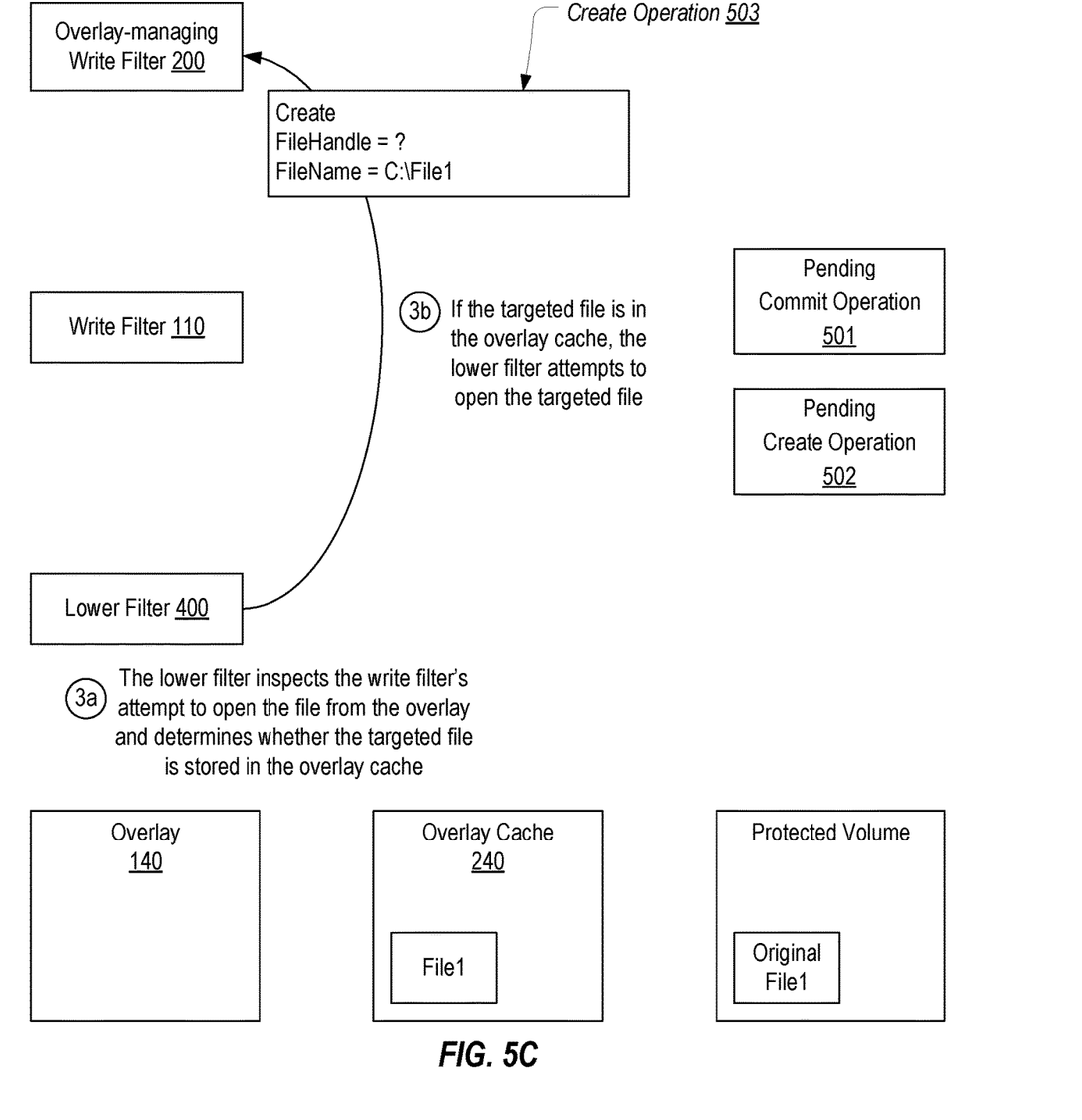

Turning to FIG. 5C, when lower filter 400 receives create operation 502, it will employ the specified filename to determine whether the targeted file is stored in overlay cache 240 in step 3a. This could be accomplished in any suitable manner including by communicating with overlay managing component 202, by querying map 203 directly, or by attempting to read the file from overlay cache 240. If lower filter 400 determines that the targeted file is not in overlay cache 240 (e.g., because it is stored in overlay 140), it can allow create operation 502 to proceed in a normal fashion. In contrast, if lower filter 400 determines that the targeted file is stored in overlay cache 240, in step 3b, it can initiate a new create operation 503 to read the file from the protected volume (e.g., by specifying a path of C:\File1 which is assumed to be the location of File1 on the protected volume). Importantly, lower filter 400 can cause create operation 503 to start at the top of the stack so that overlay-managing write filter 200 will receive it. This can be accomplished by calling IoCreateFile, by calling FltCreateFile and setting the Instance parameter to null, or by calling any other suitable function. Notably, create operation 502 will remain pending during these steps since lower filter 400 will not complete its preoperation callback routine on create operation 502 at this time.

Figure 5D:
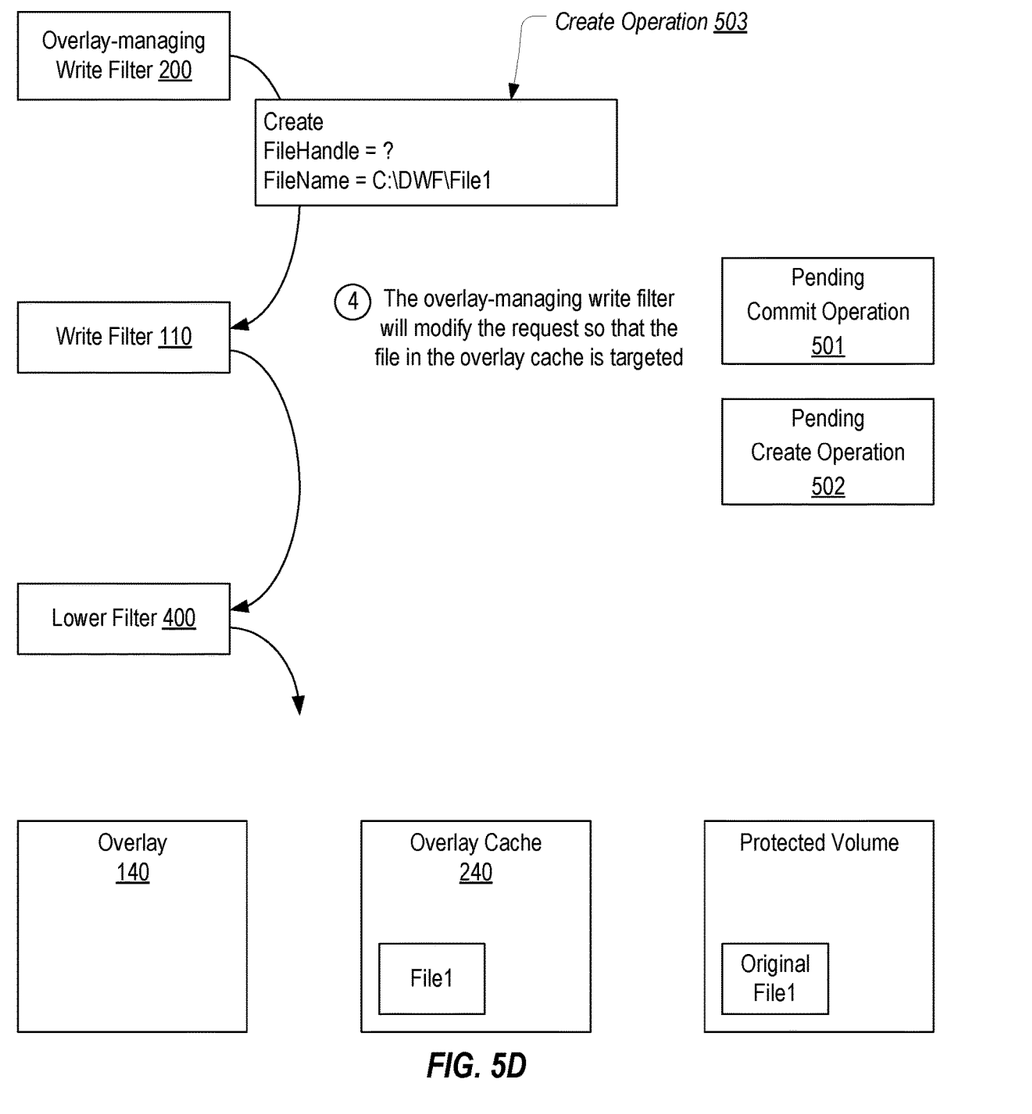
Figure 5E:
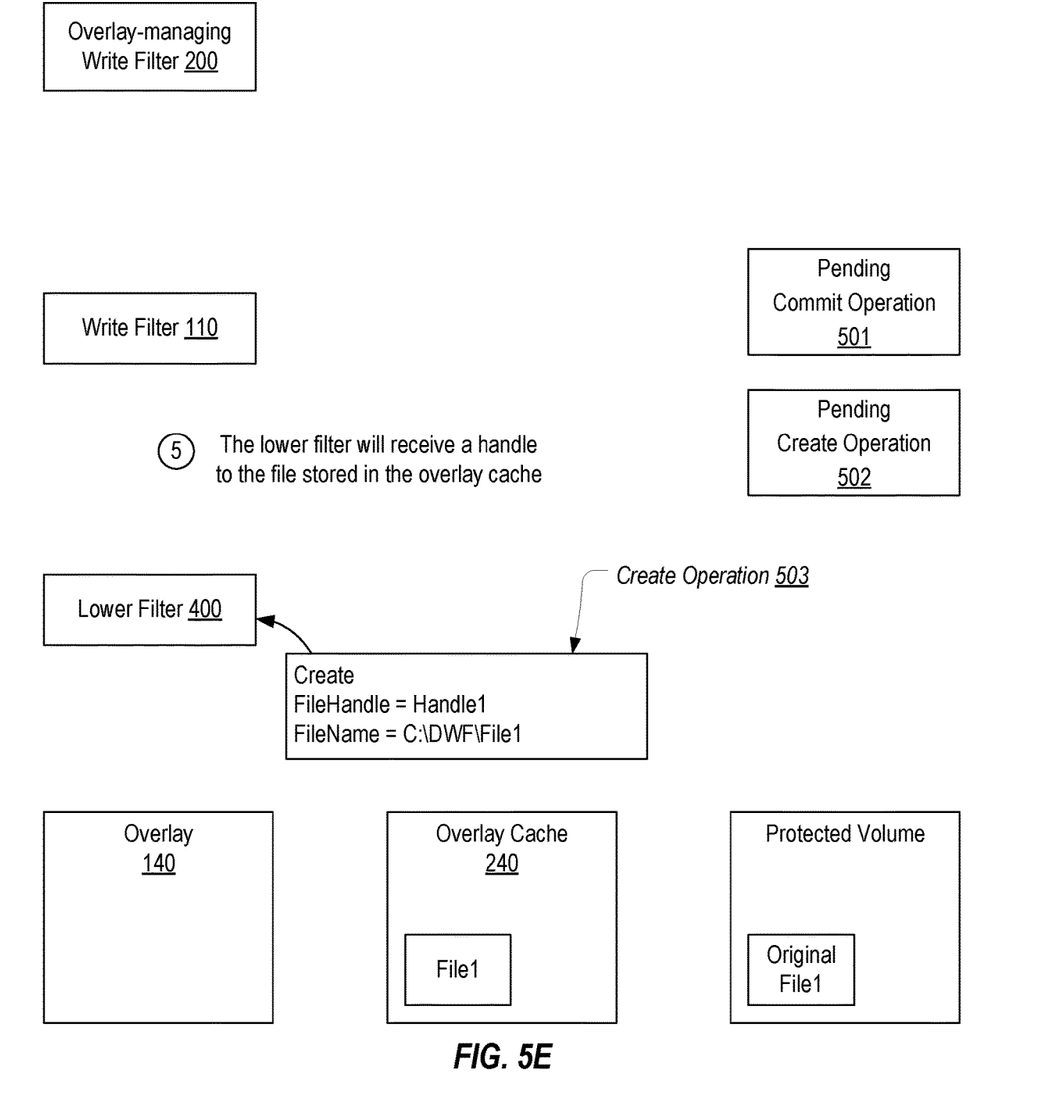

In step 4 shown in FIG. 5D, overlay-managing write filter 200 will modify create operation 503 in the manner described above to cause it to target the modified version of File1 that is stored in overlay cache 240 and then pass create operation 503 down the stack. In step 5 shown in FIG. 5E, once create operation 503 has been processed by the file system, lower filter 400 will be passed the completed request (assuming again that it has registered a postoperation callback routine for create operations). At this point, create operation 503 will include a handle (Handle1) to the file stored in overlay cache 240.

Figure 5F:
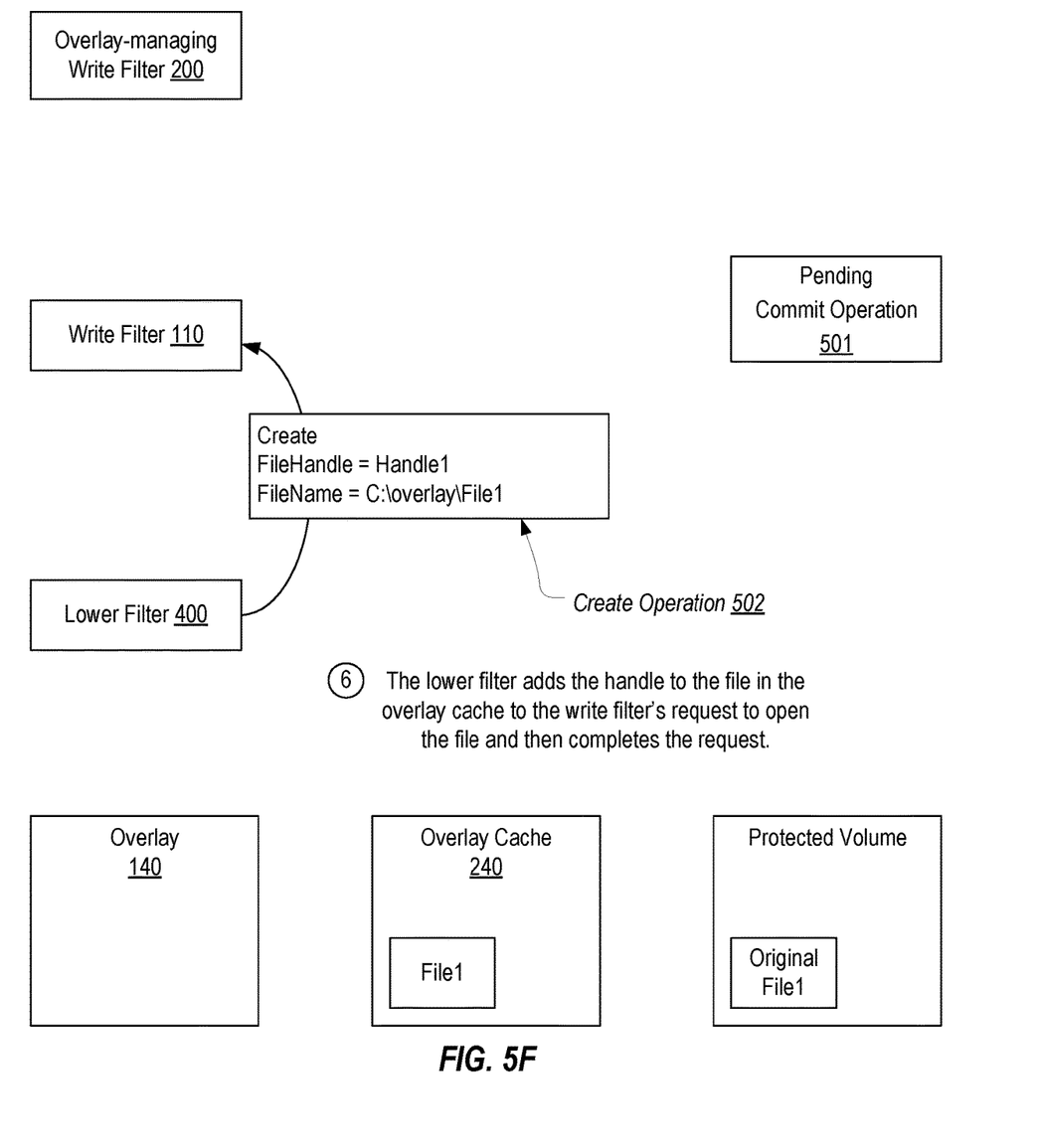

In step 6 shown in FIG. 5F, lower filter 400, which is still executing within its preoperation callback routine for handling create operation 502, will obtain the file handle from create operation 503, copy the file handle into create operation 502 and then complete create operation 502 to prevent it from being passed further down the stack. To complete create operation 502 from within its preoperation callback routine, lower filter 400 can set the IoStatus. Status field of the IO_STATUS_BLOCK structure in the corresponding FLT_CALLBACK_DATA structure to STATUS_SUCCESS and return FLT_PREOP_COMPLETE as the return value of its preoperation callback routine. As a result, create operation 502 with the handle to the file stored in overlay cache 240 will be passed up to write filter 110 (e.g., when the Filter Manager calls write filter 110's postoperation callback routine for create operation 502).

Figure 5G:
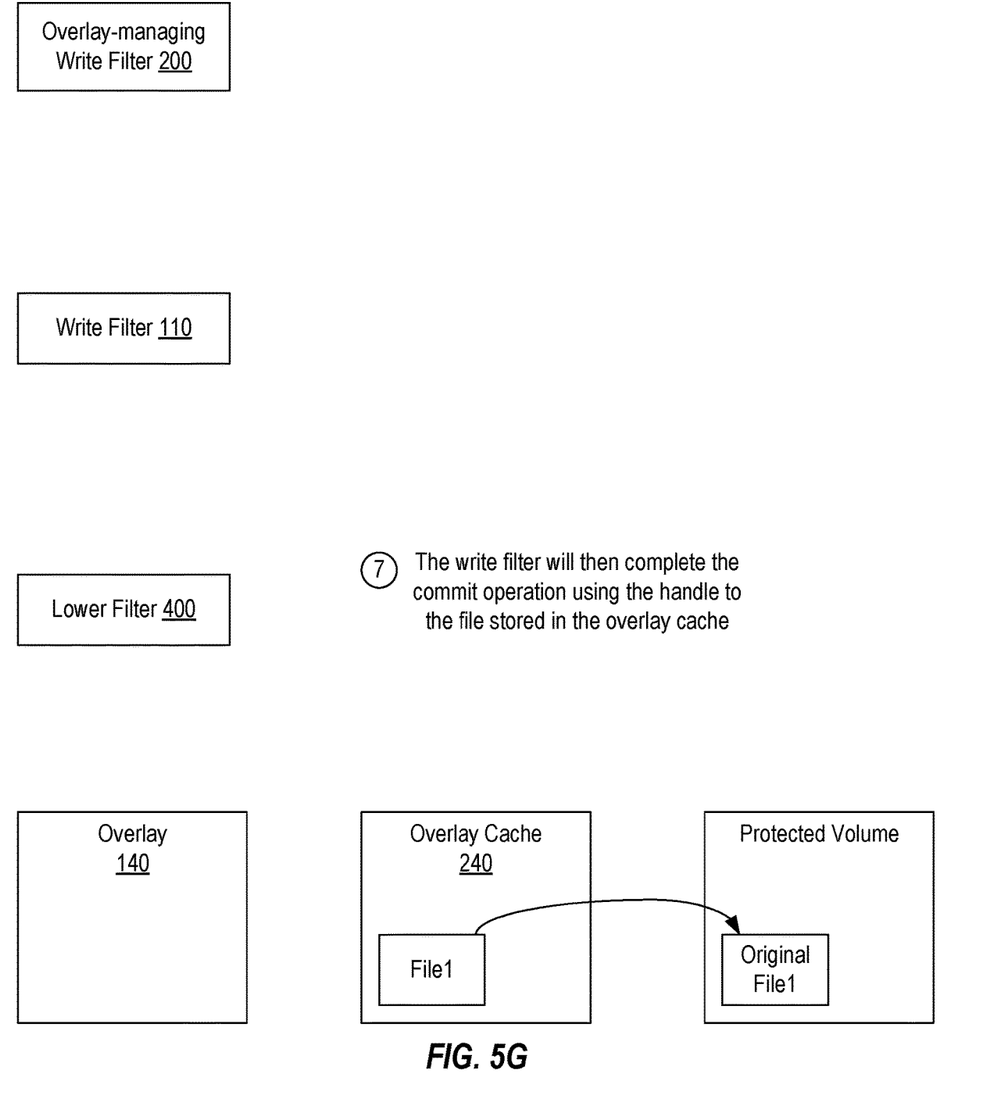

Finally, in step 7 shown in FIG. 5G, write filter 110 will complete the commit operation by employing the handle to commit the modified contents of File1 from overlay cache 240 to the original file on the protected volume. Notably, due to the processing performed by lower filter 400 and overlay-managing write filter 200, write filter 110 will believe that it is committing content that was stored in overlay 140 and will be unaware that File1 is actually stored in overlay cache 240.

The same process for handling a commit can be performed to handle a commit-delete. In particular, when write filter 110 receives a commit-delete operation, it will initiate a create request similar to create request 502 to attempt to open the file from overlay 140. Since the intended operation is a delete, this create request can specify the FILE_DELETE_ON_CLOSE flag which will cause the file to be opened and then deleted once all handles to it have been closed. Lower filter 400 will determine whether the target of the commit-delete operation is stored in overlay cache 240. If so, lower filter 400 will initiate a new create request similar to create request 503 to attempt to open the targeted file. The completion of this new create request will provide the handle to the file stored in overlay cache 240 which can then be populated into the original create request thereby causing write filter 110 to complete the commit-delete operation by deleting the file from both overlay cache 240 and the protected volume.

In summary, by structuring an overlay optimizer as upper and lower filter instances, the processing of commit and commit-delete operations can be modified so that they will complete successfully even when the targeted files have been moved from the write filter's overlay. These modifications are accomplished in a way that is transparent to the write filter.

Figure 6:
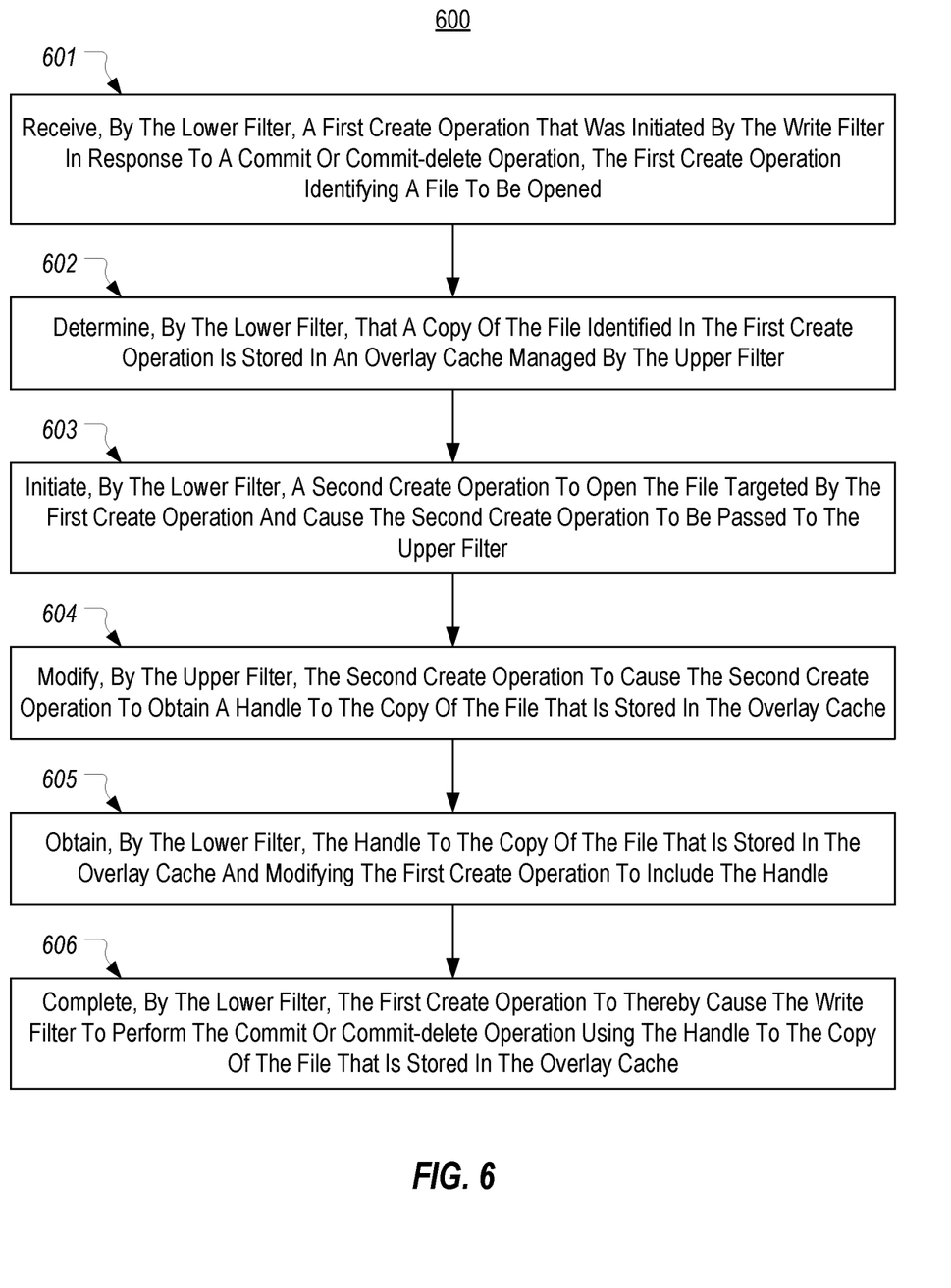
FIG. 6 illustrates a flowchart of an example method for handling a commit or commit-delete operation.

FIG. 6 provides a flowchart of an example method 600 for handling a commit or commit-delete operation. Method 600 can be implemented by an overlay optimizer that includes an upper filter positioned above a write filter in a file system stack (e.g., overlay-managing write filter 200) and a lower filter positioned below the write filter (e.g., lower filter 400).

Method 600 includes an act 601 of receiving, by the lower filter, a first create operation that was initiated by the write filter in response to a commit or commit-delete operation, the first create operation identifying a file to be opened. For example, lower filter 400 can receive create operation 502.

Method 600 includes an act 602 of determining, by the lower filter, that a copy of the file identified in the first create operation is stored in an overlay cache managed by the upper filter. For example, lower filter 400 can determine that File1 is stored in overlay cache 240.

Method 600 includes an act 603 of initiating, by the lower filter, a second create operation to open the file targeted by the first create operation and causing the second create operation to be passed to the upper filter. For example, lower filter 400 can initiate create request 503.

Method 600 includes an act 604 of modifying, by the upper filter, the second create operation to cause the second create operation to obtain a handle to the copy of the file that is stored in the overlay cache. For example, overlay-managing write filter 200 can modify create operation 503 to target File1 in overlay cache 240.

Method 600 includes an act 605 of obtaining, by the lower filter, the handle to the copy of the file that is stored in the overlay cache and modifying the first create operation to include the handle. For example, lower filter 400 can obtain the handle to File1 from create operation 503.

Method 600 includes an act 606 of completing, by the lower filter, the first create operation to thereby cause the write filter to perform the commit or commit-delete operation using the handle to the copy of the file that is stored in the overlay cache. For example, lower filter 400 can complete create operation 502.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method, performed by an overlay optimizer that includes an upper filter positioned above a write filter in a file system stack and a lower filter positioned below the write filter, for handling a commit or commit-delete operation, the method comprising:
   receiving, by the lower filter, a first create operation that was initiated by the write filter in response to the commit or commit-delete operation, the first create operation identifying a file to be opened;
   determining, by the lower filter, that a copy of the file identified in the first create operation is stored in an overlay cache managed by the upper filter;
   in response to determining that the copy of the file identified in the first create operation is stored in the overlay cache managed by the upper filter, initiating, by the lower filter, a second create operation to open the file targeted by the first create operation and causing the second create operation to be passed to the upper filter;
   modifying, by the upper filter, the second create operation to cause the second create operation to obtain a handle to the copy of the file that is stored in the overlay cache;
   obtaining, by the lower filter, the handle to the copy of the file that is stored in the overlay cache and modifying the first create operation to include the handle; and
   completing, by the lower filter, the first create operation to thereby cause the write filter to perform the commit or commit-delete operation using the handle to the copy of the file that is stored in the overlay cache.

2. The method of claim 1, wherein the lower filter receives the first create request via a preoperation callback routine.

3. The method of claim 2, wherein the step of completing the first create operation comprises completing the first create operation in the preoperation callback routine.

4. The method of claim 2, wherein the lower filter initiates the second create request in the preoperation callback routine.

5. The method of claim 1, wherein the copy of the file stored in the overlay cache comprises a modified copy of the file.

6. The method of claim 5, further comprising:
   prior to the first create operation being received, moving, by the upper filter, the modified copy of the file from an overlay of the write filter to the overlay cache.

7. The method of claim 1, wherein the upper filter and the lower filter are instances of a same filter that are loaded at different altitudes in the file system stack.

8. The method of claim 1, wherein the step of determining that the copy of the file identified in the first create operation is stored in the overlay cache comprises querying a component of the upper filter using a filename specified in the first create operation.

9. The method of claim 1, wherein the step of initiating the second create operation comprises specifying a path to the file on a protected volume and modifying the second create operation comprises specifying a path to the copy of the file that is stored in the overlay cache.

10. The method of claim 1, wherein the first create operation specifies that the file is to be opened and then deleted.

11. One or more computer storage media storing computer executable instruction which when executed by one or more processors implement a method for handling a commit or commit-delete operation, the method comprising:

receiving, at a lower filter that is positioned below a write filter in a file system stack, a first create operation that was initiated by the write filter in response to the commit or commit-delete operation, the first create operation identifying a file to be opened;

in response to receiving the first create operation that was initiated by the write filter in response to the commit or commit-deleted operation, determining that a copy of the file identified in the first create operation is stored in an overlay cache;

initiating a second create operation to open the file targeted by the first create operation;

obtaining, from the second create operation, a handle to the copy of the file that is stored in the overlay cache;

modifying the first create operation to include the handle; and completing the first create operation to thereby cause the write filter to perform the commit or commit-delete operation using the handle to the copy of the file that is stored in the overlay cache.

12. The computer storage media of claim 11, wherein the lower filter receives the first create request via a preoperation callback routine.

13. The computer storage media of claim 12, wherein completing the first create operation comprises completing the first create operation in the preoperation callback routine.

14. The computer storage media of claim 11, wherein initiating a second create operation to open the file targeted by the first create operation includes causing the second create operation to be passed to an upper filter that is positioned above the write filter.

15. The computer storage media of claim 14, wherein the method further comprises:

modifying, by the upper filter, the second create operation to target the copy of the file that is stored in the overlay cache.

16. The computer storage media of claim 11, wherein the method further comprises:

prior to the first create operation being received, moving, by an upper filter, the copy of the file from an overlay of the write filter to the overlay cache.

17. The computer storage media of claim 11, wherein the write filter is a file-based write filter.

18. A method, performed by an overlay optimizer that includes an upper filter positioned above a write filter in a file system stack and a lower filter positioned below the write filter, for handling a commit or commit-delete operation, the method comprising:

receiving, by the lower filter and via a preoperation callback routine, a first create operation that identifies a file to be opened;

determining, by the lower filter, that a copy of the file identified in the first create operation is stored in an overlay cache;

in response to determining that the copy of the file identified in the first create operation is stored in the overlay cache, initiating, by the lower filter, a second create operation to open the file targeted by the first create operation;

obtaining, from the second create operation, a handle to the copy of the file that is stored in the overlay cache;

modifying the first create operation to include the handle; and completing, by the lower filter and in the preoperation callback routine, the first create operation.

19. The method of claim 18, wherein initiating a second create operation to open the file targeted by the first create operation includes causing the second create operation to be passed to the upper filter.

20. The method of claim 18, further comprising:

prior to the first create operation being received, moving, by the upper filter, the copy of the file from an overlay of the write filter to the overlay cache.

* * * * *